3,835,029
DOWNFLOW CONCURRENT CATALYTIC CRACKING
Lewis G. Larson, Bartlesville, Okla., assignor to
Phillips Petroleum Company
Filed Apr. 24, 1972, Ser. No. 246,657
Int. Cl. B01j 9/20; C10g 11/00
U.S. Cl. 208—113                                    1 Claim

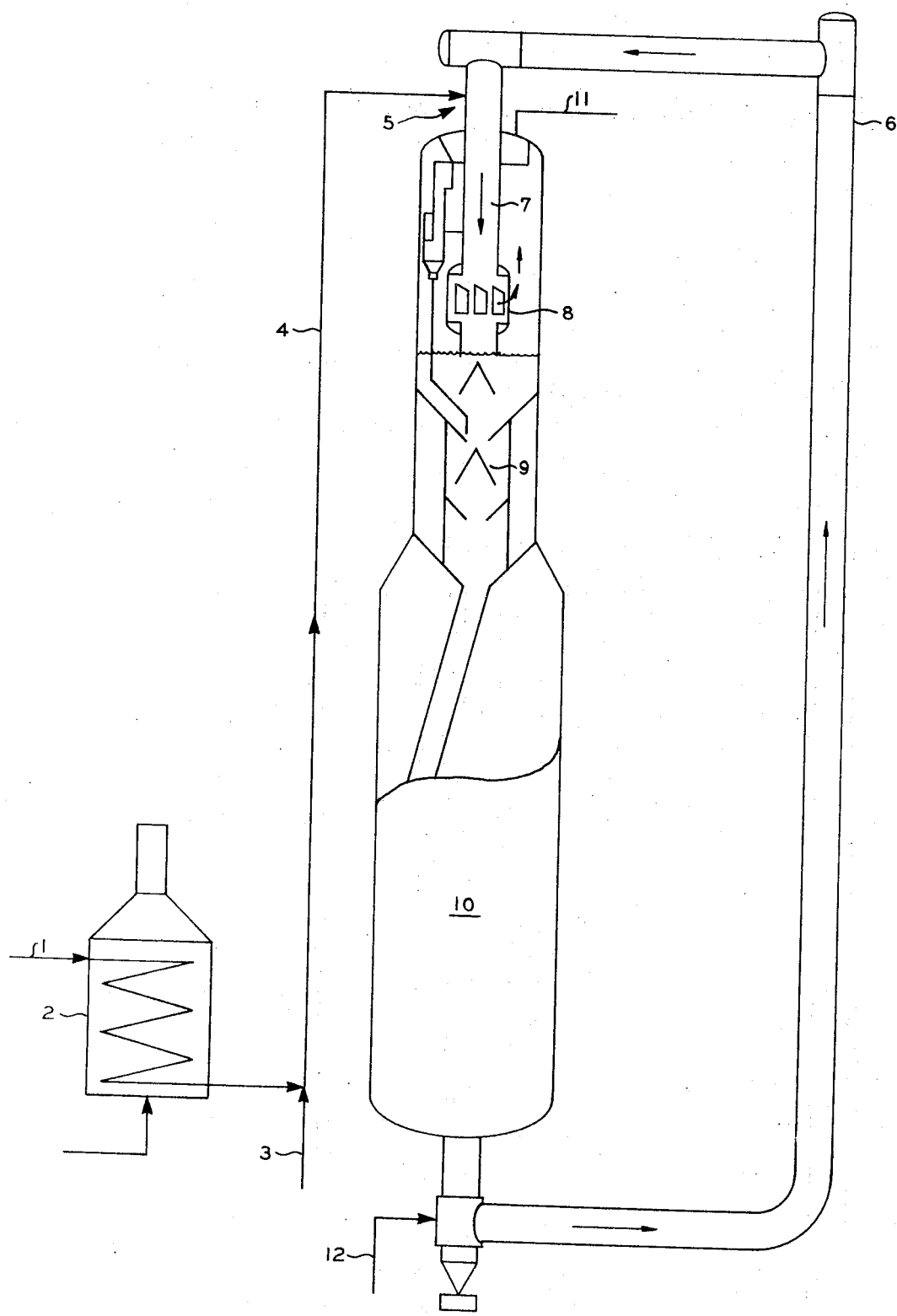

ABSTRACT OF THE DISCLOSURE

In a downflow cocurrent catalytic cracking operation, products of increased value are obtained by introducing the cracking stock, as a vapor, into contact with a zeolite-type catalyst and steam and employing a contact time within the range of from about 0.2 to about 5 seconds.

---

This invention relates to downflow cocurrent catalytic cracking.

In one of its more specific aspects, this invention relates to a novel combination of conditions which, when maintained simultaneously in the reaction chamber, contribute significantly to the quality of the product recovered from the process.

Fluidized catalytic conversion processes are well known in the processing of petroleum fractions. Such systems frequently comprise a reaction chamber down through which a hydrocarbon flows in contact with a particulate catalyst. The mixed-phased reaction mixture passes from the reaction chamber into a separation zone in which a separation of the hydrocarbon from the catalyst is made. The particulate mass is then passed in a fluidized state into the required number of subsequent separation zones in which additional hydrocarbon is separated from the catalyst. From a final separation zone, the catalyst is passed to a regenerator from which, after regeneration, it is reintroduced into contact with the fresh feed.

A simplified version of such a process as is here concerned is described in U.S. Pat. 2,965,454, the disclosure of which is incorporated herein by reference.

Among the more recent refinements to fluid catalytic cracking processes has been the use of highly active zeolite-type catalyst. The method of this invention is directed to improvements related to such operation when conducted with that catalyst.

According to this invention there is provided an improved process for catalytically cracking a hydrocarbon feed, the feed being at a temperature of about 1000° F. when introduced into contact with the catalyst, this introduction being made in the presence of steam, the contact between the hydrocarbon feed, steam, and the zeolite-type catalyst being maintained for a period within the range of from about 0.2 to about 5 seconds. Under these conditions the catalyst and hydrocarbon feed are passed downwardly in cocurrent flow, the catalyst being suspended in the hydrocarbon in dilute phase cracking.

As a result of this invention, there is produced a product containing a greater proportion of gasoline and olefins suitable for alkylation or other petrochemical uses. Operations can be adjusted for maximum gasoline, high olefin or maximum middle distillate yields.

As mentioned, zeolite-type, or molecular-sieve type, catalyst such as are commercially available are employed. These catalysts are available having a particle size in the range of from about 5 to about 100 microns.

The method of this invention is applicable to any conventional fluid catalytic cracking stock and is performable in conventional catalytic cracking apparatus. That apparatus illustrated in the aforementioned patent can be employed.

The invention is conducted by introducing the cracking stock, or feed, into contact with either a fresh or a regenerated catalyst having a coke content, as a practical matter, limited to about 0.2 weight percent of the catalyst. The cracking stock, substantially completely vaporized, which generally involves a temperature within the range of from about 950° F. to 1025° F., is introduced with steam into contact with the downward flowing catalyst which will be at a temperature within the range of from about 1050 to 1300° F. The steam will be introduced in an amount within the range of from about 3 to about 45 pounds per barrel of feed and the catalyst to oil feed weight ratio will be within the range of from about 5 to about 25. The steam temperature is about that of the oil feedstock temperature, that is, about 950 to about 1025° F.

Preferably, the feed and steam will be introduced into contact with the catalyst in the downcomer between the regenerator and the separator at a point wherein the catalyst velocity is within the range of from about 30 to about 100 feet per second. This velocity is attained, at least in part, by maintaining a suitable differential pressure between the regenerator and the separator which will usually be maintained at a differential pressure up to about 25 p.s.i. Reactor pressure should be low, preferably 5 to 15 p.s.i.g. The aforementioned reaction contact time maintained between the feed and the catalyst in the downcomer prior to separation of the catalyst from the hydrocarbons in the separator.

Operation under the above-defined conditions constitutes the best mode for carrying out the invention and produces very favorable conversions of from 55 to 90 liquid volume percent, conversion being defined as 100 minus the liquid volume percent of cycle oil, the products of conversion including gaseous products, gasoline stocks and coke.

The method of this invention was carried out employing various combinations of the above operating conditions at reaction temperatures within the range of 1000° F. to 1135° F. and at catalyst densities in the dilute phase within the range of 1 to 3 pounds per cubic foot. Contact times were within the range of about 0.2 to about 5 seconds. The average of a plurality of runs, all conducted within these parameters, was as follows:

| | |
|---|---|
| Ethane and Lighter, s.c.f./bbl. Feed | 70 to 420 |
| Hydrogen, s.c.f./bbl. Feed | 13 to 90 |
| Propylenes and Butylenes, Liq. Vol. Percent of Feed [1] | 10 to 40 |
| Isobutane, Liq. Vol. Percent of Feed | 2 to 6 |
| 60° F. to 430° F. E.P. Gasoline, Liq. Vol. Percent of Feed [2] | 50 to 60 |
| Coke, Wt. Percent of Feed | 3 to 6 |
| Coke, Wt. Percent of Spent Catalyst | 0.2 to 1 |
| Product Value, $/bbl. Feed | 4.29 to 4.78 |

[1] Olefin yields have high purity and value as alkylation feed.
[2] Gasoline plus alkylate yields range from 90 to 115 Liq. Vol. percent of feed.

It will be seen from the above that high gasoline yields and a high dollar product value are realized by the method of this invention.

The method of this invention can also be carried out in the apparatus depicted in the attached drawing in which a cracking stock, such as a virgin gas oil, 600° F. to 1100° F. boiling range, 28° API, is supplied through conduit 1 to heater 2 at the outlet from which it leaves at a temperature of 1000° F. and is combined with superheated steam at a temperature of 1000° F. and a recycled slurry oil introduced through conduit 3. The mixture is conducted through conduit 4 into a mixing zone 5 where the feed is mixed with catalyst recycled through conduit 6 at a temperature of 1100° F.

The mixture passes downwardly in cocurrent flow, under the conditions specified previously, through reactor 7 where the cracking takes place under the prescribed conditions of contact time. The hydrocarbon and catalyst mixture passes into separator 8 from which the catalyst passes into stripper 9 and then into the countercurrent regenerator 10, with the hydrocarbon being passed through conduit 11 to a recovery system. From the bottom of the regenerator, the regenerated catalyst passes into conduit 6 through which it is recycled to the mixing zone by means of transport gas introduced through conduit 12.

It will be evident that various modifications can be made to the method of this invention. Such are considered, however, to be within the scope of the invention.

What is claimed is:

1. A process comprising:
   (a) forming a first mixture comprising a hydrocarbon feed and steam, said mixture containing steam in an amount within the range of from about 3 to about 45 pounds per barrel of said hydrocarbon feed;
   (b) passing said first mixture into a zeolite catalyst to form a second mixture;
   (c) maintaining said catalyst in contact with said first mixture at a catalyst to hydrocarbon feed weight ratio within the range of from about 5 to about 25 for a period within the range of from about 0.2 to about 5 seconds at at a temperature within the range of from about 1000° F. to about 1135° F. at a catalyst density in the dilute phase within the range of from 1 to 3 pounds per cubic foot, said hydrocarbon feed being passed into said catalyst at a catalyst velocity within the range of from about 30 to about 100 feet per second and under conditions to crack said hydrocarbon feed to form cracking products; and,
   (d) recovering said cracking products.

References Cited

UNITED STATES PATENTS

| | | | |
|---|---|---|---|
| 3,042,196 | 7/1962 | Payton et al. | 208—113 |
| 3,074,878 | 1/1963 | Pappas | 208—127 |
| 3,565,790 | 2/1971 | Schwartzenbek | 208—153 |
| 2,420,558 | 5/1947 | Munday | 208—163 |
| 2,965,454 | 12/1960 | Harper | 23—288 |
| 3,617,512 | 11/1971 | Bryson et al. | 208—120 |

DELBERT E. GANTZ, Primary Examiner

G. E. SCHMITKONS, Assistant Examiner

U.S. Cl. X.R.

23—288 S; 208—120, 148, 153, 156

UNITED STATES PATENT OFFICE

CERTIFICATE OF CORRECTION

Patent No. 3,835,029              Dated: September 10, 1974

Lewis G. Larson

It is certified that error appears in the above-identified patent and that said Letters Patent are hereby corrected as shown below:

Column 1, in the title, delete "CONCURRENT" and insert therefor — COCURRENT —; column 3, line 25, delete "to form a second mixture"; column 3, line 26, delete "maintaining" and insert therefor — passing —; column 3, line 26, after "catalyst" insert — downwardly —; column 4, line 9, delete "cracking" and insert therefor — cracked —; column 4, line 11, delete "cracking" and insert therefor — cracked —.

Signed and sealed this 3rd day of December 1974.

(SEAL)
Attest:

McCOY M. GIBSON JR.                C. MARSHALL DANN
Attesting Officer                  Commissioner of Patents